United States Patent
Lin

(10) Patent No.: US 8,161,628 B2
(45) Date of Patent: Apr. 24, 2012

(54) ASSEMBLING DEVICE WITH COMPLEMENTARY RECEIVING MEMBERS AND MANUFACTURING COMBINATION INCORPORATING SAME

(75) Inventor: Chun-Yu Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 427 days.

(21) Appl. No.: 12/464,886

(22) Filed: May 13, 2009

(65) Prior Publication Data

US 2009/0320278 A1  Dec. 31, 2009

(30) Foreign Application Priority Data

Jun. 26, 2008  (CN) .......................... 2008 1 0302362

(51) Int. Cl.
*B21D 39/00* (2006.01)
(52) U.S. Cl. ................ 29/700; 29/434; 29/463; 29/464; 29/281.1; 29/281.5; 29/284; 220/4.22; 220/4.24
(58) Field of Classification Search .............. 29/407.09, 29/407.1, 428, 434, 463, 464, 700, 799, 281.1, 29/281.2, 281.5, 284; 269/289 R, 296, 909; 220/4.21, 4.22, 4.23, 4.24, 4.25
See application file for complete search history.

(56) References Cited

U.S. PATENT DOCUMENTS

| | | | | |
|---|---|---|---|---|
| 5,078,266 A | * | 1/1992 | Rackley ......................... | 206/349 |
| 5,145,068 A | * | 9/1992 | Schmitz et al. ............... | 206/472 |
| 6,446,797 B1 | * | 9/2002 | Shiga ............................ | 206/303 |

* cited by examiner

*Primary Examiner* — Jermie Cozart
(74) *Attorney, Agent, or Firm* — Altis Law Group, Inc.

(57) ABSTRACT

An assembling device for attaching a light guide plate and a reflecting member together is provided. The assembling device includes a first receiving member and a second receiving member. The first receiving member defines a first recess therein for accommodating the light guide plate. The second receiving member defines a second recess therein for accommodating the reflecting member. The assembling device has an open position and a closed position. The light guide plate is capable of being loaded in the first recess and the reflecting member is capable of being loaded in the second recess when the assembling device is in the open position. The first receiving member and the second receiving member are aligned with and parallel to each other when the assembling device is in the closed position.

17 Claims, 3 Drawing Sheets

ASSEMBLING DEVICE WITH COMPLEMENTARY RECEIVING MEMBERS AND MANUFACTURING COMBINATION INCORPORATING SAME

BACKGROUND

1. Technical Field

The present invention relates generally to assembling devices, and particularly to an assembling device for assembling parts of a backlight module.

2. Description of Related Art

Every liquid crystal display requires an accompanying light source. In the case of a transmissive liquid crystal display or a transmissive-reflective liquid crystal display, the light source is typically a backlight module. When the light source is a backlight module, the liquid crystal display is operative to provide an image with uniform brightness. In such liquid crystal displays, the backlight module is one of the key components of the liquid crystal display Typically, the backlight module includes a light guide plate and a reflecting panel attached on a surface of the light guide plate. When the reflecting panel is attached to the light guide plate during manufacturing, it can be difficult to accurately align the reflecting panel on the light guide plate. This may reduce the efficiency of assembly.

Therefore, what is needed is an assembling device that can overcome the above-described shortcomings.

BRIEF DESCRIPTION OF THE DRAWINGS

Many aspects of the present assembling device can be better understood with reference to the following drawings. The components in the drawings are not necessarily drawn to scale, the emphasis instead being placed upon clearly illustrating the principles of the present assembling device. Moreover, in the drawings, like reference numerals designate corresponding parts throughout the several views.

DETAILED DESCRIPTION OF EMBODIMENTS

Reference will now be made to the drawings to describe present embodiments of the present assembling device.

Figure 1:
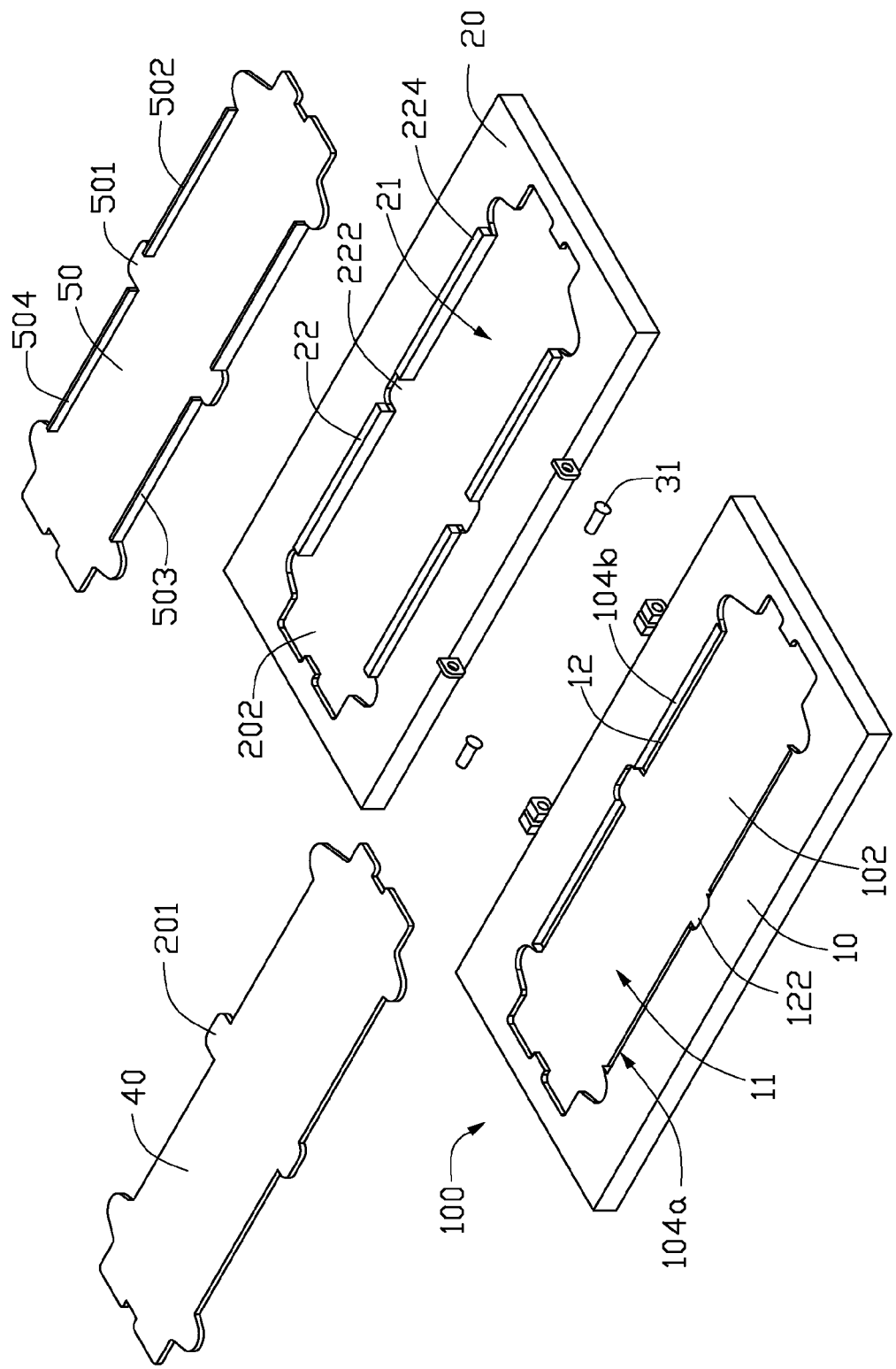
FIG. 1 is a schematic, isometric, disassembled view of an assembling device according to a first embodiment, together with a light guide plate and a reflecting plate.
Figure 2:
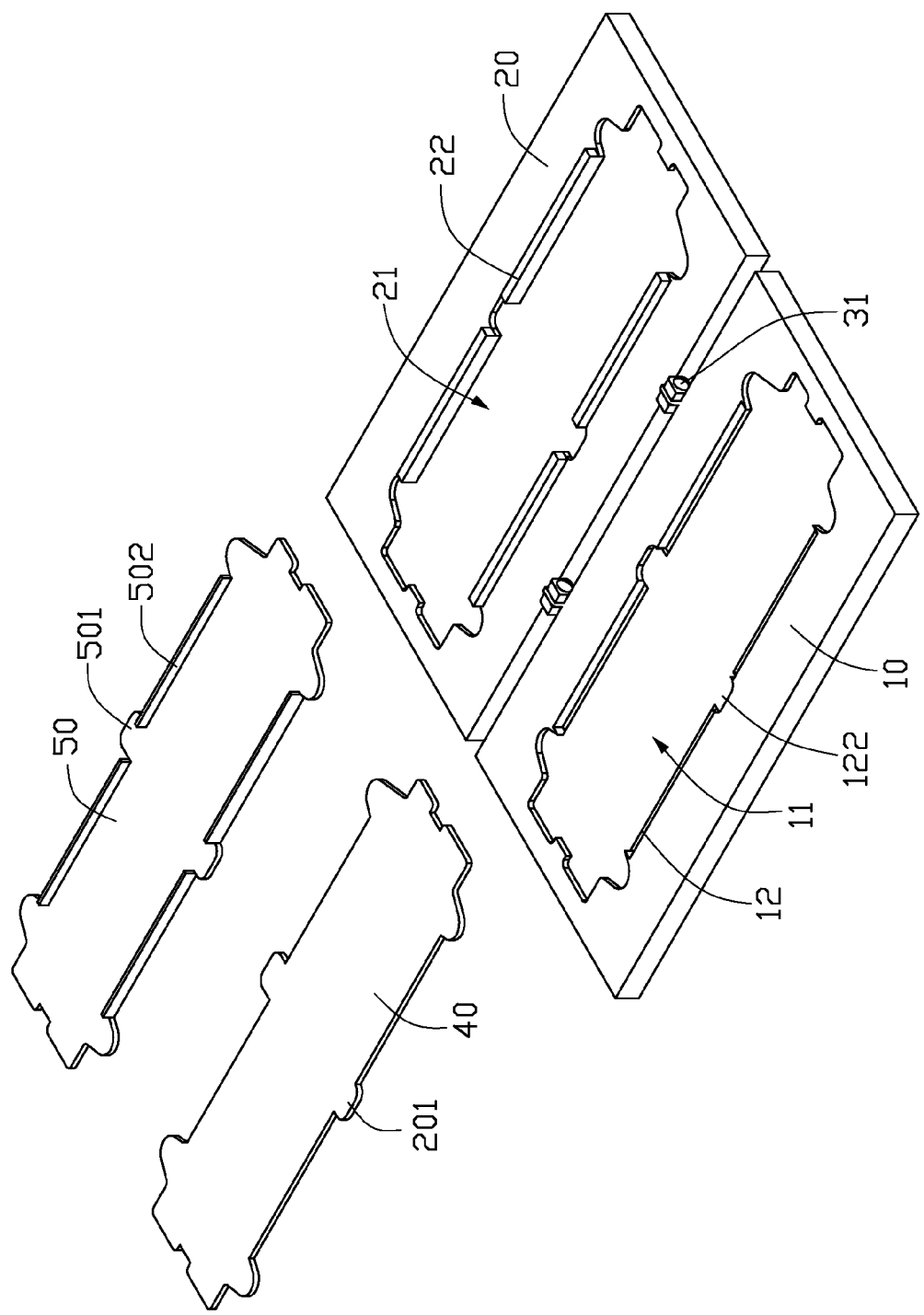
FIG. 2 is similar to FIG. 1, but showing the assembling device assembled and in an open position.

Referring to FIGS. 1 and 2, an assembling device 100 in accordance with a first exemplary embodiment is illustrated. The assembling device 100 is configured for attaching a light guide plate 40 and a reflecting plate 50 together. The light guide plate 40 and the reflecting plate 50 form part of a backlight module. The assembling device 100 includes a first receiving member 10 and a second receiving member 20. The first receiving member 10 is pivotally coupled with the second receiving member 20 using two pivot pins 31, such that the first receiving member 10 is pivotable between an open position and a closed position.

The first receiving member 10 is configured for receiving the light guide plate 40. The first receiving member 10 defines a first recess 11. In this embodiment, the first recess 11 has a rectangular shape. The first receiving member 10 has a same shape as the light guide plate 40, so that the light guide plate 40 can be matingly engaged in the first recess 11. The first receiving member 10 defines a first bottom surface 102 and two opposite side surfaces 104a and 104b, all of which bound the first recess 11. The two side surfaces 104a and 104b are adjacent to and communicate with the first bottom surface 102. Each of the two side surfaces 104a and 104b defines a cutout 122 therein. A protrusion 201 extends from a middle of each of two opposite long sides of the light guide plate 40. The protrusion 201 is configured for matingly engaging in the respective cutout 122. This can prevent the light guide plate 40 from moving in the first recess 11.

The second receiving member 20 is similar to the first receiving member 10. The reflecting plate 50 has a shape similar to the light guide plate 40. The second receiving member 20 defines a second recess 21. The reflecting plate 50 is matingly received in the second recess 21. The second receiving member 20 defines two cutouts 222. A protrusion 501 extends from a middle of each of two opposite long sides of the reflecting plate 50. The protrusion 501 is configured for matingly engaging in the respective cutout 222. Thus the cutouts 222 correspond to the cutouts 122, and the protrusions 501 correspond to the protrusions 201.

The distinguishing features between the second receiving member 20 and the first receiving member 10 are as follows. The first receiving member 10 defines four positioning slots 12 in the bottom surface 102. Two of the four positioning slots 12 are adjacent to the side surface 104a at two opposite sides of the corresponding cutout 122, respectively, and extend along a direction parallel to the side surface 104a. The other two of the four positioning slots 12 are adjacent to the side surface 104b at two opposite sides of the corresponding cutout 122, respectively, and extend along a direction parallel to the side surface 104b. The second receiving member 20 defines a bottom surface 202 that bounds the second recess 21. Four positioning protrusions 22 extend perpendicularly from the bottom surface 202. The locations of the four positioning protrusions 22 correspond to those of the positioning slots 12 in the bottom surface 102. The four positioning protrusions 22 are configured for being inserted into the four positioning slots 12.

A distinguishing feature in shape between the reflecting plate 50 and the light guide plate 40 is that the reflecting plate 50 further includes four bent portions 502. Two of the four bent portions 502 are formed along one of the long sides of the reflecting plate 50, adjacent to two opposite sides of the corresponding protrusion 501. These bent portions 502 extend in a direction perpendicular to a main body of the reflecting plate 50. The other two bent portions 502 are formed along the opposite long side of the reflecting plate 50, adjacent to two opposite sides of the corresponding protrusion 501. These bent portions 502 also extend in the direction perpendicular to the main body of the reflecting plate 50. Each protrusion 501 has an outer surface 503 perpendicular to the main body of the reflecting plate 50 and facing outwardly away from the reflecting plate 50. Each protrusion 502 also has an inner surface 504 at a side thereof opposite from the outer surface 503. Each positioning protrusion 22 has an inner surface 224 perpendicular to the main body of the light guide plate 40. When the reflecting plate 50 is received in the second receiving member 20, the outer surfaces 503 of the four protrusions 501 contact the inner surfaces 224 of the four positioning protrusions 22.

A combined thickness of each positioning protrusion 22 and the corresponding protrusion 501 is less than or equal to a width of the corresponding positioning slot 12. When the light guide plate 40 is received in the first receiving member 10, the side surfaces 104a and 104b of the first receiving member 10 are spaced from the light guide plate 40, thereby exposing the positioning slots 12. When the assembling device 100 is in the closed position, each positioning protrusion 22 and the corresponding protrusion 501 are received in the corresponding positioning slot 12.

In use, in the beginning, the assembling device 100 is in the open position. The light guide plate 40 is matingly received in the first receiving member 10, and the reflecting plate 50 is matingly received in the second receiving member 20. The inner surfaces 504 of the protrusions 502 are coated with glue (adhesive). Then the second receiving member 20 is rotated relative to the first receiving member 10, thereby putting the assembling device 100 in the closed position. The positioning protrusions 22 and the protrusions 502 are inserted in the corresponding positioning slots 12, thereby aligning the first receiving member 10 and the second receiving member 20. The glue contacts the surfaces (edges) of the long sides of the light guide plate 40. After the glue is solidified, the light guide plate 40 and the reflecting plate 50 are bonded together. Finally, the combined light guide plate 40 and reflecting plate 50 is taken out of the assembling device 100. This subassembly can then be utilized in manufacturing a backlight module.

Figure 3:
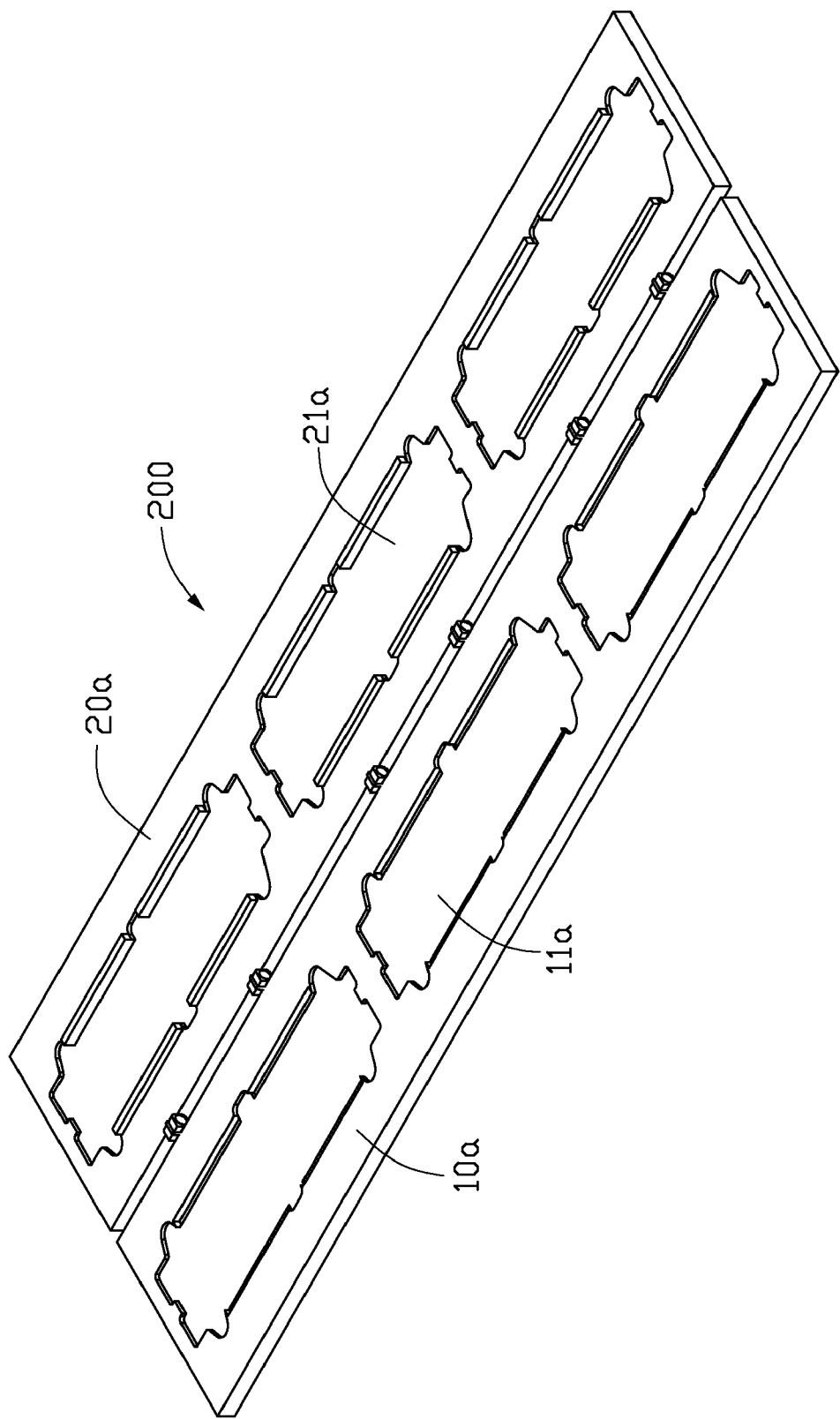
FIG. 3 is a schematic, isometric view of an assembling device according to a second embodiment.

Referring to FIG. 3, an assembling device 200 according to a second exemplary embodiment is illustrated. The assembling device 200 includes a first receiving member 10a and a second receiving member 20a pivotally connected with each other. The first receiving member 10a defines three first recesses 11a substantially identical to the first recesses 11 of the first embodiment. The second receiving member 20a defines three second recesses 21a substantially identical to the second recess 21 of the first embodiment. The three first recesses 11a correspond to the three second recesses 21a. In this embodiment, the assembling device 200 can assemble three light guide plates 40 and three corresponding reflecting plates 50 together at a time.

The present assembling device can align the light guide plate and the reflecting plate by cooperation between the positioning protrusions and the positioning slots, thus reducing the risk of misalignment and increasing the efficiency of assembly.

It is to be understood, however, that even though numerous characteristics and advantages of the present embodiments have been set forth in the foregoing description, together with details of the structures and functions of the embodiments, the disclosure is illustrative only; and changes may be made in detail, especially in matters of shape, size, and arrangement of parts within the principles of the invention to the full extent indicated by the broad general meaning of the terms in which the appended claims are expressed.

What is claimed is:

1. An assembling device for attaching a light guide plate and a reflecting member together, the assembling device comprising:
    a first receiving member defining therein a first recess, two opposing first side surfaces, and a first bottom surface, the first side surfaces and the first bottom surface bounding the first recess, the first recess being configured for accommodating the light guide plate, four positioning slots being defined in the first bottom surface of the first recess, two of the four positioning slots being adjacent to and parallel to one of the first side surfaces, and the other two of the four positioning slots being adjacent to and parallel to the other first side surface;
    a second receiving member defining therein a second recess, and a second bottom surface, the second recess being configured for accommodating the reflecting member, four positioning protrusions extending from the second bottom surface of the second recess, the four positioning protrusions configured for being inserted into the four positioning slots thereby aligning the first receiving member and the second receiving member; and
    a hinge interconnecting the first receiving member and the second receiving member such that the first receiving member and the second receiving member are rotatable relative to each other.

2. The assembling device of claim 1, wherein each of the first side surfaces defines a cutout, the cutout being arranged between the two corresponding positioning slots at the first side surface.

3. The assembling device of claim 1, wherein the second receiving member further defines two opposing second side surfaces, the second side surfaces and the second bottom surface bounding the second recess, two of the four positioning protrusions being adjacent to and parallel to one of the second side surfaces, and the other two of the four positioning protrusions being adjacent to and parallel to the other second side surface.

4. The assembling device of claim 3, wherein each of the second side surfaces defines a cutout, the cutout being arranged between the two corresponding positioning protrusions at the second side surface.

5. An assembling device for attaching a light guide plate and a reflecting member together, the assembling device comprising:
    a first receiving member defining therein a first recess, two opposing first side surfaces, and a first bottom surface, the first side surfaces and the first bottom surface bounding the first recess, the first recess being configured for accommodating the light guide plate, four positioning slots being defined in the first bottom surface of the first recess, two of the four positioning slots being adjacent to and parallel to one of the first side surfaces, and the other two of the four positioning slots being adjacent to and parallel to the other first side surface; and
    a second receiving member defining therein a second recess and a second bottom surface, the second recess being configured for accommodating the reflecting member, four positioning protrusions extending from the second bottom surface of the second recess; and
    the assembling device having an open position and a closed position, the light guide plate capable of being loaded in the first recess and the reflecting member capable of being loaded in the second recess when the assembling device is in the open position, and the positioning protrusions being inserted into the positioning slots thereby aligning the first receiving member and the second receiving member with each other with the first receiving member and the second receiving member being parallel to each other when the assembling device is in the closed position.

6. The assembling device of claim 5, wherein the first receiving member and the second receiving member abut each other when the assembling device is in the closed position.

7. The assembling device of claim 5, further comprising a hinge interconnecting the first receiving member and the second receiving member such that the first receiving member and the second receiving member are rotatable relative to each other between the open position and the closed position.

8. The assembling device of claim 5, wherein each of the first side surfaces defines a cutout, the cutout being arranged between the two corresponding positioning slots at the first side surface.

9. The assembling device of claim 5, wherein the second receiving member further defines two opposing second side surfaces, the second side surfaces and the second bottom surface bounding the second recess, two of the four positioning protrusions being adjacent to and parallel to one of the second side surfaces, and the other two of the four positioning protrusions being adjacent to and parallel to the other second side surface.

10. The assembling device of claim 9, wherein each of the second side surfaces defines a cutout, the cutout being arranged between the two corresponding positioning protrusions at the second side surface.

11. A manufacturing combination, comprising:
 a light guide plate;
 a reflecting member; and
 an assembling device comprising:
  a first receiving member defining therein a first recess, two opposing first side surfaces, and a first bottom surface, the first side surfaces and the first bottom surface bounding the first recess, the first recess being configured for accommodating the light guide plate, four positioning slots being defined in the first bottom surface of the first recess, two of the four positioning slots being adjacent to and parallel to one of the first side surfaces, and the other two of the four positioning slots being adjacent to and parallel to the other first side surface; and
  a second receiving member defining therein a second recess and a second bottom surface, the second recess being configured for accommodating the reflecting member, four positioning protrusions extending from the second bottom surface of the second recess;
 the assembling device having an open position and a closed position, the light guide plate being loaded in the first recess and the reflecting member being loaded in the second recess when the assembling device is in the open position, and the positioning protrusions being inserted into the positioning slots thereby aligning the first receiving member and the second receiving member with each other with the first receiving member and the second receiving member being parallel to each other when the assembling device is in the closed position.

12. The manufacturing combination of claim 11, wherein the first receiving member and the second receiving member abut each other when the assembling device is in the closed position.

13. The manufacturing combination of claim 12, wherein the light guide plate and the reflecting member are engaged with each other when the light guide plate is loaded in the first recess and the reflecting member is loaded in the second recess and the assembling device is in the closed position.

14. The manufacturing combination of claim 11, wherein the assembling device further comprises a hinge interconnecting the first receiving member and the second receiving member such that the first receiving member and the second receiving member are rotatable relative to each other between the open position and the closed position.

15. The manufacturing combination of claim 11, wherein each of the first side surfaces defines a cutout, the cutout being arranged between the two corresponding positioning slots at the first side surface.

16. The manufacturing combination of claim 15, wherein the second receiving member defines two opposing second side surfaces, the second side surfaces and the second bottom surface bounding the second recess, two of the four positioning protrusions being adjacent to and parallel to one of the second side surfaces, and the other two of the four positioning protrusions being adjacent to and parallel to the other second side surface.

17. The manufacturing combination of claim 16, wherein each of the second side surfaces defines a cutout, the cutout being arranged between the two corresponding positioning protrusions at the second side surface.

\* \* \* \* \*